(12) United States Patent
Perkins et al.

(10) Patent No.: US 9,422,827 B2
(45) Date of Patent: Aug. 23, 2016

(54) APPARATUS AND METHOD FOR SERVICING GAS TURBINE ENGINES

(71) Applicant: General Electric Company, Schenectady, NY (US)

(72) Inventors: Devin Patrick Perkins, Greenville, SC (US); William Lawrence Byrne, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 546 days.

(21) Appl. No.: 13/975,109

(22) Filed: Aug. 23, 2013

(65) Prior Publication Data
US 2015/0052910 A1    Feb. 26, 2015

(51) Int. Cl.
*F01D 25/00* (2006.01)
*F23R 3/48* (2006.01)
*F01D 9/02* (2006.01)
*F01D 19/00* (2006.01)
*F01D 21/00* (2006.01)
*F01D 5/28* (2006.01)

(52) U.S. Cl.
CPC ............... *F01D 25/00* (2013.01); *F01D 5/288* (2013.01); *F01D 9/023* (2013.01); *F01D 19/00* (2013.01); *F01D 21/003* (2013.01); *F23R 3/48* (2013.01); *B23P 2700/13* (2013.01); *F05D 2230/70* (2013.01); *F05D 2230/72* (2013.01); *F23R 2900/00019* (2013.01); *Y10T 29/49229* (2015.01)

(58) Field of Classification Search
CPC ............ F23R 3/48; F23R 2900/00019; F01D 9/023; F01D 19/00; F01D 21/003; F01D 5/288
See application file for complete search history.

(56) References Cited

U.S. PATENT DOCUMENTS

| | | | |
|---|---|---|---|
| 2,832,195 A * | 4/1958 | Weissborn, Jr. | .......... F23R 3/48 285/302 |
| 5,361,577 A | 11/1994 | Cromer | |
| 7,712,302 B2 | 5/2010 | Nichols et al. | |
| 8,220,246 B2 | 7/2012 | Widener | |

OTHER PUBLICATIONS

U.S. Appl. No. 13/682,965, filed Nov. 21, 2012, Patrick Melton et al.

* cited by examiner

*Primary Examiner* — Phutthiwat Wongwian
*Assistant Examiner* — William Breazeal
(74) *Attorney, Agent, or Firm* — Fletcher Yoder, P.C.

(57) ABSTRACT

The present disclosure relates to an apparatus having an elongated body configured to be inserted into a tubular structure extending between a first combustor and a second combustor of a gas turbine engine. A movable arm may be positioned proximate to a first end of the elongated body, and the movable arm may be configured to engage a surface of the first combustor when the elongated body is placed within the tubular structure. A drive member may be accessible near a second end of the elongated body, and the drive member may be configured to rotate within the elongated body and to drive the movable arm along a longitudinal axis of the elongated body toward the second end to separate the tubular structure from the second combustor.

20 Claims, 8 Drawing Sheets

APPARATUS AND METHOD FOR SERVICING GAS TURBINE ENGINES

BACKGROUND

The subject matter disclosed herein relates to gas turbine engines, and more particularly to an apparatus and method for servicing gas turbine engines.

Gas turbine engines include one or more combustors, which receive and combust air and fuel to produce hot combustion gases. For example, the gas turbine engine may include multiple combustors positioned circumferentially around a rotational axis. In some gas turbine engines, one or more crossfire tubes may extend between and connect adjacent combustors. During service or inspection, an operator may need to remove a single combustor from the gas turbine engine. However, in order to do so, in some combustors, the operator may need to disassemble and/or access an adjacent combustor in order to disengage the crossfire tube from the combustor to be removed. Such procedures are time consuming and can cause increased downtime of the gas turbine engine for service or inspection.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an apparatus includes an elongated body having a first end and a second end. The elongated body is be configured to be inserted into a tubular structure extending between a first combustor and a second combustor of a gas turbine engine. The apparatus also includes a movable arm positioned proximate to the first end of the elongated body, and the movable arm is configured to engage a surface of the first combustor when the elongated body is placed within the tubular structure. The apparatus also includes a drive member positioned within the elongated body and accessible near the second end of the elongated body. The drive member is configured to rotate within the elongated body and to drive the movable arm along a longitudinal axis of the elongated body toward the second end to separate the tubular structure from the second combustor.

In a second embodiment, a method includes inserting an elongated body through a passageway of a tubular structure extending between a first combustor and a second combustor, the elongated body having a first end and a second end. The method also includes engaging a surface of a first combustor with an arm coupled to the elongated body, wherein the arm is disposed proximate to the first end of the elongated body. The method also includes decreasing a distance between the arm and the second end of the elongated body to compress the tubular structure to separate the tubular structure from the second combustor.

In a third embodiment, a method includes accessing a first end of a crossfire tube via a combustor and inserting an elongated body into the first end of the crossfire tube, wherein the elongated body extends from the combustor into an adjacent combustor when disposed within the crossfire tube. The method also includes rotating a drive member coupled to the elongated body to reduce a length of the crossfire tube, and separating the crossfire tube from the combustor without accessing the adjacent combustor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
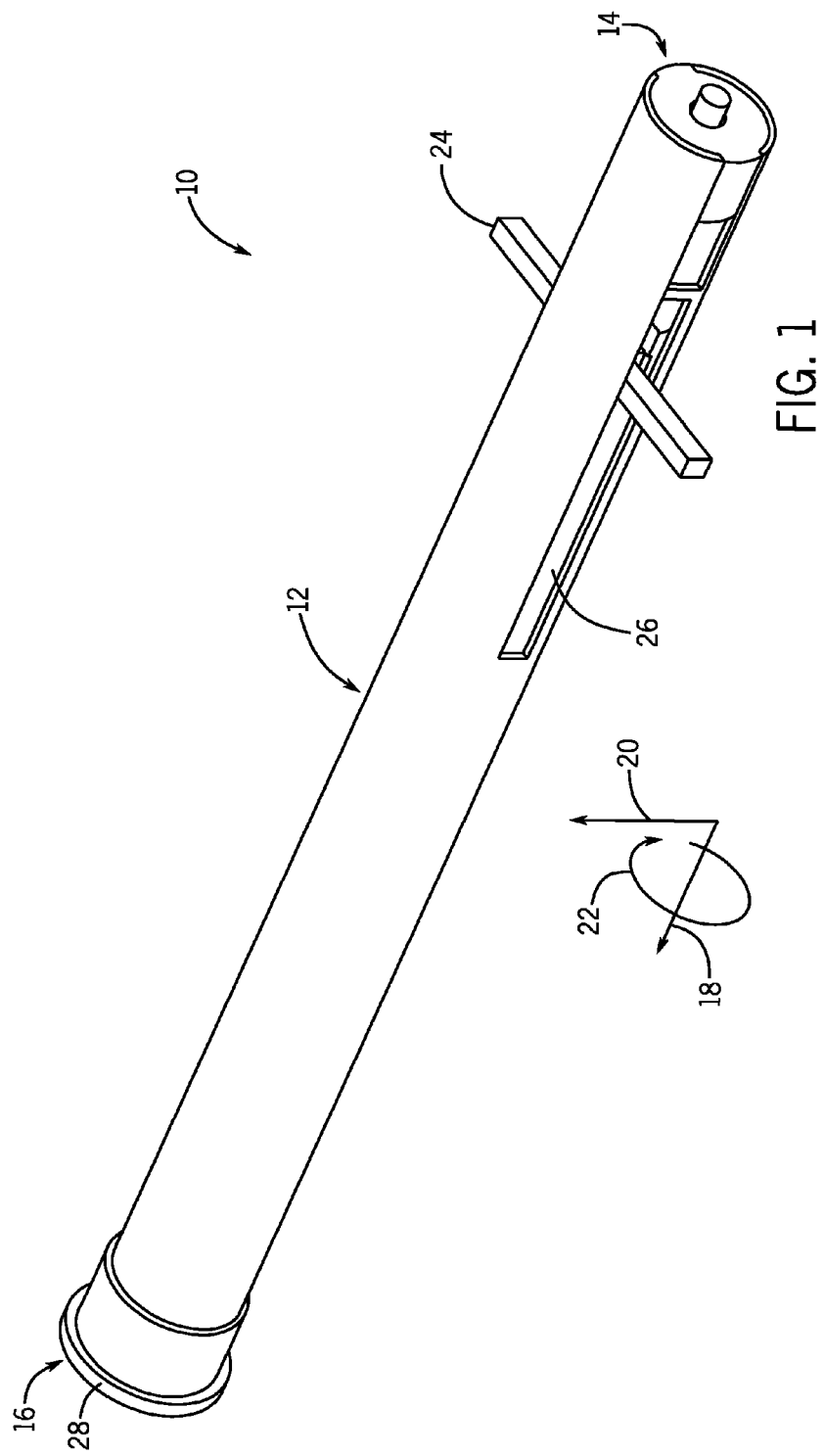
FIG. 1 is a perspective view of an embodiment of an apparatus configured to disengage a combustor from a crossfire tube.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed toward an apparatus and method configured to facilitate removal of a combustor from a gas turbine engine. Gas turbine engines may comprise a plurality of combustors in a can-annular arrangement. In some gas turbine engines, adjacent combustors may be coupled together or connected by one or more tubular structures (e.g., crossfire tubes). The crossfire tubes may serve various functions within the gas turbine engine. For example, the crossfire tubes may enable the ignition of fuel in one combustor from the ignited fuel in an adjacent combustor. Thus, separate igniters in each combustor may be omitted when the crossfire tubes are used. The crossfire tubes may also serve to equalize the pressure between adjacent combustors. The crossfire tubes utilized in gas turbine engines have various forms and configurations. For example, in some gas turbine engines, the crossfire tubes are compressible (e.g., telescoping) and are spring-loaded in place between adjacent combustors. Additionally, in certain gas turbine engines, the crossfire tubes may not be directly accessible, but may only be accessed via one or more of the adjacent combustors.

Combustors of the gas turbine engine may undergo periodic servicing or repair. During service operations, an operator may desire to access and/or to remove one combustor from the gas turbine engine. However, in order to remove the combustor, the combustor is detached (e.g., separated, released, etc.) from the crossfire tube. In order to detach the combustor from the crossfire tube in some gas turbine engines, the operator accesses both ends of the crossfire tube extending between adjacent combustors. Thus, the operator accesses and disassemble multiple combustors in order to remove the one combustor in need of replacement or repair. Such steps can be time consuming, as head end portions of multiple combustors are removed to access the multiple combustors. The present disclosure is directed toward an apparatus and method configured to facilitate removal of a combustor without accessing both ends of the crossfire tube or disassembling the adjacent combustor. Such an apparatus may desirably reduce the time to inspect or repair the combustor, thus reducing the outage duration required for inspection and repairs. Additionally, such an apparatus may desirably enable removal of the combustor while leaving the adjacent combustor and/or the crossfire tube intact (e.g., without cutting or affecting the adjacent combustor and/or the crossfire tube).

With the foregoing in mind, FIG. 1 illustrates an embodiment of an apparatus 10 (e.g., a crossfire tube service tool) that may be utilized to disengage a crossfire tube from a combustor of a gas turbine engine. As shown, the apparatus 10 may have a generally elongated body 12 extending from a first end 14 to a second end 16. The elongated body 12 may be generally cylindrical, although any suitable shape or geometry is envisioned. The elongated body 12 may be defined with reference to a longitudinal axis or direction 18, a radial axis or direction 20, and a circumferential or rotational axis or direction 22. The elongated body 12 may include or may be coupled to one or more arms 24 (e.g., moveable arms, articulating arms, or expandable features) positioned proximate to the first end 14 and configured to extend (e.g., move, unfold, expand, protrude) radially-outwardly 20 from the elongated body 12. In some embodiments, the movable arms 24 are configured to extend radially-outwardly 20 via first and second openings 26 (e.g., slots, compression slots, or compression stage openings) formed on the elongated body 12. The openings 26 may also be configured to limit or to prevent movement of the moveable arms 24 in the rotational direction 22, as described in more detail below. The elongated body 12 may include a lip 28 (e.g., a protrusion) positioned proximate to the second end 16. The lip 28 may protrude radially-outwardly 20 from the elongated body 12, and the lip 28 may at least partially circumferentially 22 surround the elongated body 12. As described in more detail below, the various features of the apparatus 10 may be configured to facilitate disengagement of the crossfire tube from the combustor of the gas turbine engine.

Figure 2:
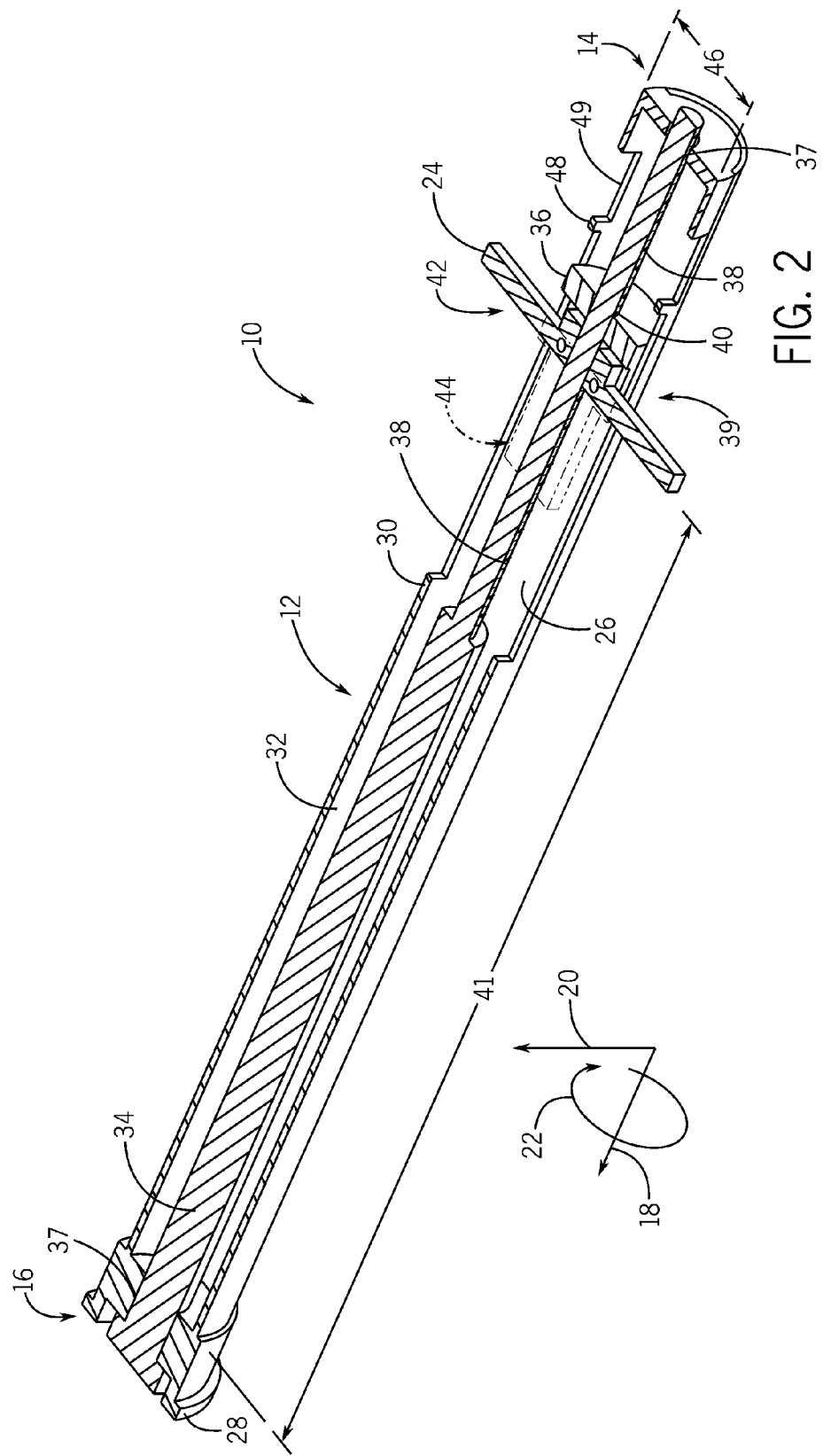
FIG. 2 is a cross-sectional view of the embodiment of the apparatus of FIG. 1.

FIG. 2 illustrates a cross-sectional view of the apparatus 10 of FIG. 1. As shown, a wall 30 surrounds a cavity 32 of the elongated body 12. Additionally, in the depicted embodiment, a drive member 34 (e.g., lead screw, threaded rod, or threaded shaft) is disposed within the cavity 32 of the elongated body 12. The drive member 34 may generally extend from the first end 14 to the second end 16, and in some embodiments, the drive member 34 extends past the first end 14 and/or the second end 16 of the elongated body 12. The drive member 34 may be accessible and/or actuated (e.g., moved, pulled, and/or rotated by a user or tool) proximate the second end 16 of the elongated member 12, and the drive member 34 may be concentrically placed within one or more bearings 37 (e.g., threadless portions of the elongated body 12). In the illustrated embodiment, the drive member 34 may be configured to rotate in place (e.g., may not move in the longitudinal direction 18 along the elongated body 12) when actuated. The drive member 34 may be coupled to a support structure 36 (e.g., arm support structure or threaded support structure). In some embodiments, the drive member 34 includes threads 38 (e.g., male threads) that engage corresponding threads (not shown) of the support structure 36.

The support structure 36 may, in turn, be coupled (e.g., rotatably or pivotably coupled) to the movable arms 24, and together the support structure 36 and the movable arms 24 may form an arm assembly 39. In operation, the arm assembly 39 may travel in the longitudinal direction 18 within the elongated body 12. In certain embodiments, the arm assembly 39 may travel along the drive member 34 in the longitudinal direction 18 via a threaded connection 40 between the drive member 34 and the support structure 36. For example, during actuation (e.g., rotation) of the drive member 34, the drive member 34 may rotate in place and the arm assembly 39 may move along the threads 38 in the longitudinal direction 18 toward the second end 16 of the elongated body 12, as described in more detail below. Such movement of the arm assembly 39 may decrease a distance 41 between the second end 16 of the elongated body 12 and the arm assembly 39.

In FIG. 2, the movable arms 24 are shown rotated into an open position 42 (e.g., a first position extending radially-outwardly from the elongated body 12). In certain embodiments, the movable arms 24 are configured to be rotated into a stowed position 44 (e.g., a second position stored within the elongated body 12) within the cavity 32 of the elongated body 12. In the stowed position 44, the movable arms 24 may be completely recessed within the elongated body 12 (i.e., without any protruding portions). For example, the movable arms 24 may be stored within the cavity 32 to reduce a diameter 46 of the apparatus 10 and to facilitate insertion of the elongated body 12 into the crossfire tube. In operation, the movable arms 24 may be in the stowed position 44 when the arm assembly 39 is proximate to (e.g., adjacent to, resting against, etc.) the first end 14 of the elongated member 12. As set forth above, the arm assembly 39 may move in the longitudinal direction 18 toward the second end 16 by actuation of the drive member 34. In some embodiments, the movable arms 24 may contact a stop 48 (e.g., feature, activation structure, actuation structure, or protrusion) that is coupled to or formed in the wall 30 of the elongated body 12 as the arm assembly 39 moves in the longitudinal direction 18, and the stop 48 may be configured to cause the movable arms 24 to transition (e.g., rotate) from the stowed position 44 to the open position 42. First and second actuation openings 49 (e.g., actuation slot or actuation stage) may be provided on the elongated body 12 to enable the arm assembly 39 to move in the longitudinal direction 18 while the moveable arms 24 are in the stowed position 44 and to facilitate rotation of the movable arms 24 from the stowed position 44 to open position 42 upon contacting the stop 48, as described in more detail below.

Once the moveable arms 24 are in the open position 42, the drive member 34 may be actuated (e.g., may be rotated in place) to drive the arm assembly 39 in the longitudinal direction 18 toward the second end 16 of the elongated body 12 while the moveable arms 24 extend or protrude from the first and second openings 26. In some embodiments, the first and second openings 26 and/or the first and second actuation openings 49 may be configured to limit or prevent rotational 22 movement of the moveable arms 24. For example, at various stages of operation, portions of the movable arms 24 may be protrude through or extend into the openings 26, 49 and may contact the wall 30 of the elongated body 12. Such a configuration may limit or prevent rotational 22 movement of the movable arms 24, and thus may facilitate longitudinal 18 movement of the arm assembly 39 along the threads 28 as the drive member 34 rotates in place.

Although the embodiments illustrated herein depict the drive member 34 as a threaded member threadably coupled to the support structure 36 and configured to rotate in place to drive the arm assembly 39, it should be understood that the drive member 34 may be configured to drive the arm assembly 39 in any of a variety of suitable manners. For example, the support structure 36 may be fixedly attached to the drive member 34, and the drive member 34 may be configured to move in the longitudinal direction 18. Thus, in such embodiments, the drive member 34 may be moved (e.g., pulled by a user or tool) toward the second end 16 of the elongated body 12, thereby moving the arm assembly 39 in the longitudinal direction 18 toward the second end 16 of the elongated body 12. Operation of the moveable arms 24 and the drive member 34 are described in more detail below.

Figure 3:
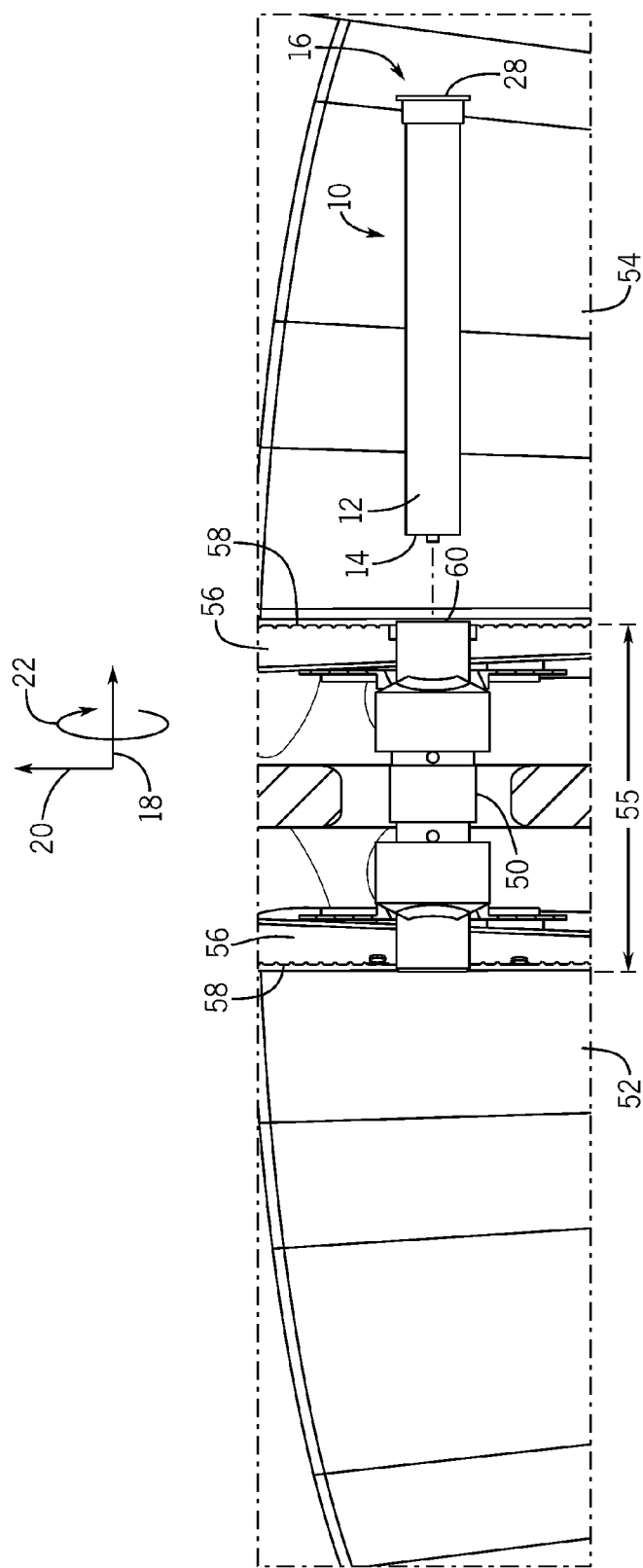
FIG. 3 is partial side view of adjacent combustors joined by a crossfire tube, in accordance with one embodiment.

FIGS. 3-6 illustrate one method for disengaging a combustor from a crossfire tube using the apparatus 10, in accordance with one embodiment. As shown in FIG. 3, a crossfire tube 50 extends between a first combustor 52 and a second combustor 54. For purposes of clarity in the following discussion, the first combustor 52 may be the adjacent or functioning combustor, and the second combustor 54 may be the target combustor that is to be removed for repair or inspection, for example. As noted above, in certain gas turbine engines, the crossfire tube 50 may be compressible (e.g., telescoping) and may be biased (e.g., spring-loaded) against the first combustor 52 and the second combustor 54. The crossfire tube 50 may have a length 55 and may extend through a flow sleeve assembly 56 to a liner 58 of each combustor 52, 54. As shown in FIG. 3, in order to disengage the crossfire tube 50 from the second combustor 54, the operator may access the second combustor 54 and align the apparatus 10 with a first opening 60 (e.g., a first end) of the crossfire tube 50.

Figure 4:
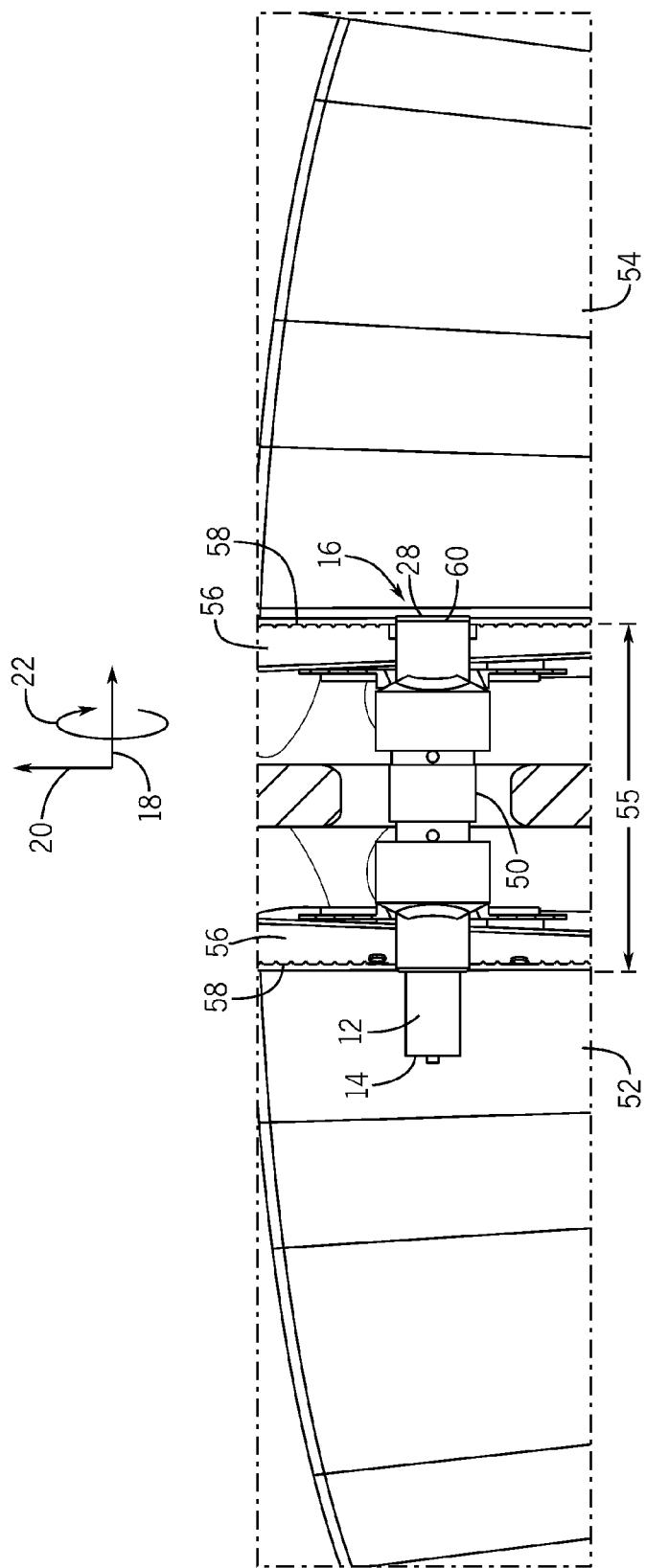
FIG. 4 is a partial side view of the combustors of FIG. 3, wherein the apparatus is positioned within the crossfire tube, in accordance with one embodiment.

As shown in FIG. 4, the first end 14 of the elongated body 12 is inserted into the first opening 60 of the crossfire tube 50, accessed from the second combustor 54. At least a portion of the elongated body 12 may be positioned within the crossfire tube 50, and the elongated body 12 may extend from the first combustor 52 into the second combustor 54. As the elongated body 12 is inserted through the crossfire tube 50, the movable arms 24 may be in the stowed position 44. The elongated body 12 may be positioned within the crossfire tube 50, such that the lip 28 engages the first opening 60 of the crossfire tube 50.

Figure 5:
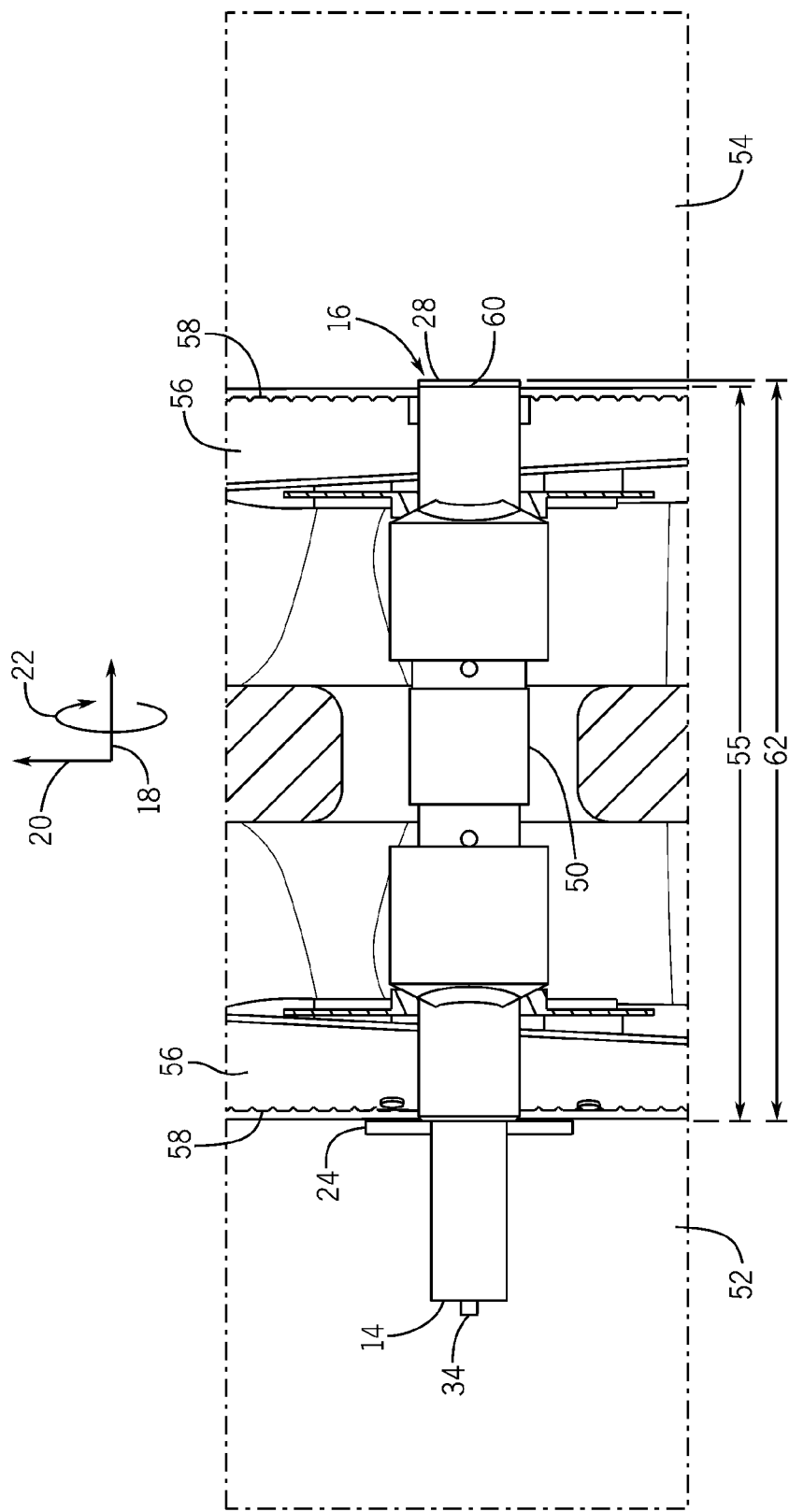
FIG. 5 is a partial side view of the combustors of FIG. 3, wherein the apparatus engages a surface of one combustor, in accordance with one embodiment.

As shown in FIG. 5, when the first end 14 of the elongated body 12 is positioned in the first combustor 52, the movable arms 24 may transition (e.g., rotate or unfold) from the stowed position 44 to the open position 42 to engage the liner 58 of the first combustor 52. For example, in certain embodiments, the movable arms 24 may be driven to move toward the second end 16 by rotating the drive member 34, and such movement may cause the movable arms 24 to unfold or extend from the elongated body 12, as described in more detail below. When the movable arms 24 engage the liner 58 of the first combustor 52, the movable arms 24 and the second end 16 of the elongated body 12 may be separated by a distance 62.

Figure 6:
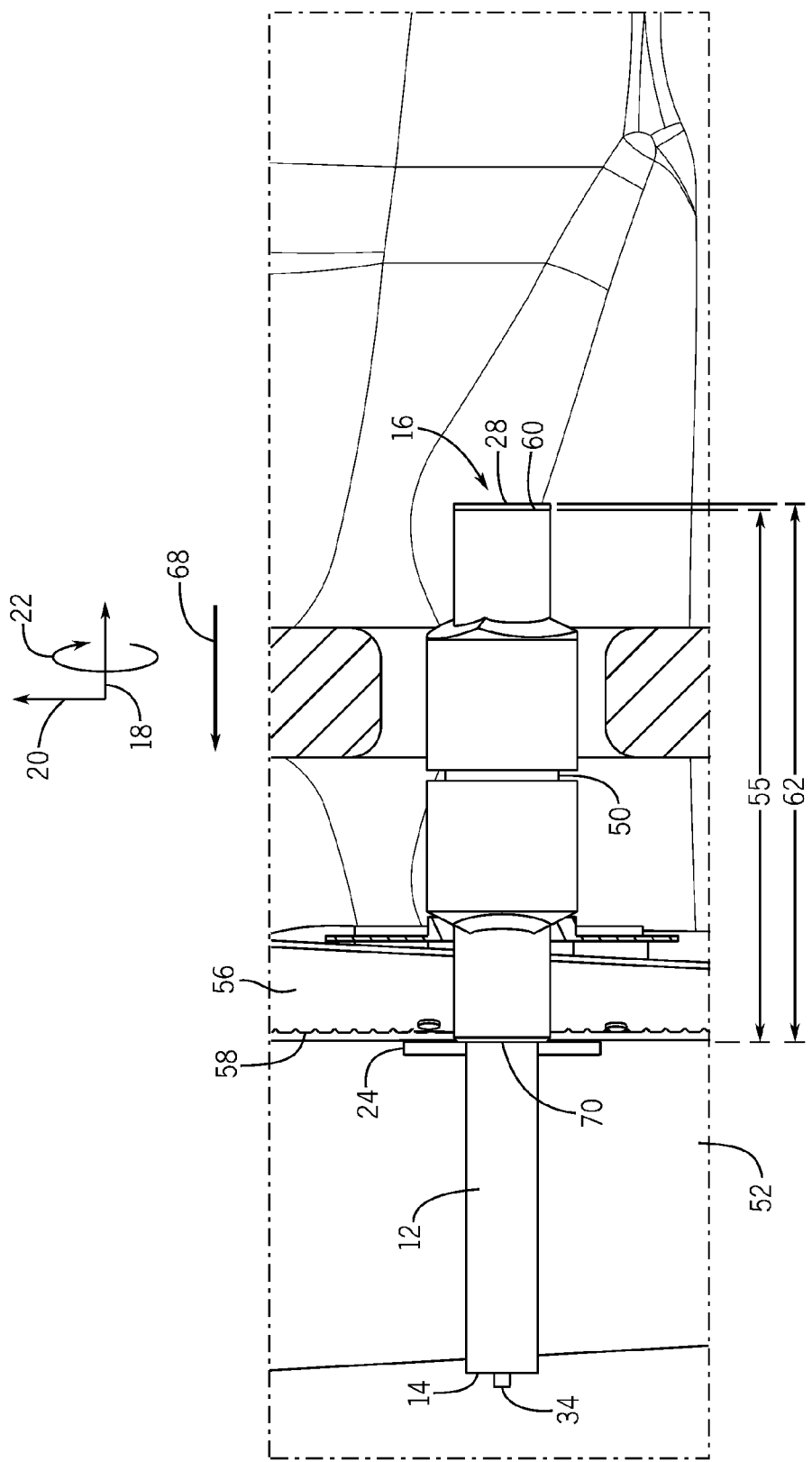
FIG. 6 is a partial side view of the combustors of FIG. 3, wherein the apparatus compresses the crossfire tube, in accordance with one embodiment.

FIG. 6 illustrates the crossfire tube 50 compressed by the apparatus 10 to facilitate removal of the second combustor 54. In operation, once the first combustor 52 is suitably engaged by the movable arms 24 and the first end 60 of the crossfire tube 50 is engaged by the lip 28, the distance 62 between the second end 16 of the elongated body 12 and the movable arms 24 may be decreased, as shown by arrow 68. The distance 62 may be decreased via any suitable drive, such as via the drive member 34. As set forth above, in certain embodiments, the drive member 34 may be rotated proximate to the second end 16 of the elongated body 12, and such rotation may move the movable arms 24 along the drive member 34 toward the second end 16. Through such techniques, the apparatus 10 may compress the crossfire tube 50 and may reduce the length 55 of the crossfire tube 50, thus disengaging the crossfire tube 50 from the second combustor 54 (e.g., the crossfire tube 50 is compressed, such that the crossfire tube 50 is clear of the second combustor 54). As indicated in the above discussion, the apparatus 10 may enable the second combustor 54 to be disengaged from the crossfire tube 50 without requiring the operator to directly access the second opening 70 (e.g., second end) of the crossfire tube 50 and/or to disassemble the first combustor 52. In certain embodiments, the second combustor 54 may be removed while leaving the first combustor 52 and the crossfire tube 50 intact (e.g., without disassembling the first combustor 52 and/or without affecting or cutting the crossfire tube 50).

The apparatus 10 may also be utilized in installation of a new combustor or in reinstallation of the second combustor 54 once repaired or inspected. Installation of the new combustor may be completed by generally reversing the steps set forth above. For example, the new combustor may be positioned within the gas turbine engine, and the drive member 34 may be actuated to increase the distance 62 between the second end 16 of the elongated body 12 and the movable arms 24. Through such techniques, the compressed crossfire tube 50 may expand and the length 55 of the crossfire tube 50 may increase until the crossfire tube 50 contacts the new combustor. Actuation of the drive member 34 may cause the movable arms 24 to move toward the first end 14, and the movable arms 24 may retract or fold radially-inwardly 20 upon contacting the stop 48, for example. Once the moveable arms 24 are in the stowed position 44 (e.g., as described above with respect to FIG. 2), the apparatus 10 may be withdrawn or removed from the crossfire tube 50. Thus, the new combustor may be installed using the apparatus 10 without accessing or disassembling the first combustor 52.

Figure 7:
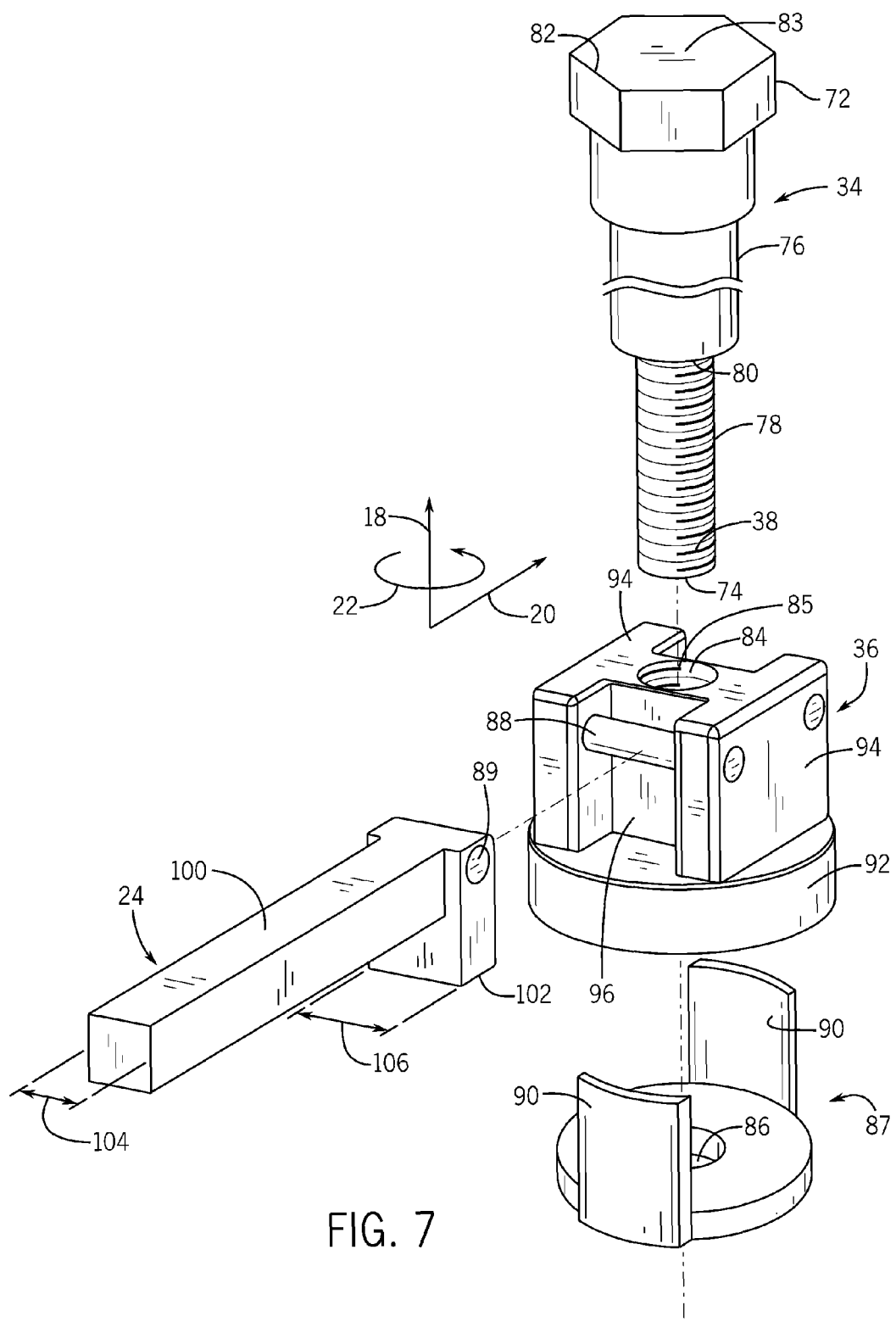
FIG. 7 is an exploded view of a portion of the apparatus of FIG. 1, in accordance with one embodiment.

FIG. 7 is an exploded view of various components of the apparatus 10, in accordance with certain embodiments. As shown, the drive member 34 extends from a first end 72 to a second end 74. In certain embodiments, the drive member 34 may have a first portion 76 (e.g., rod or cylinder portion) that is generally larger in diameter than a second portion 78 (rod or cylinder portion). A shoulder 80 between the first portion 76 and the second portion 78 of the drive member 34 may limit the movement the support structure 36 along the drive member 34, for example. In some embodiments, one or both of the first portion 76 and the second portion 78 include a threaded rod (e.g., male threads on a rod portion) configured to facilitate separation of the crossfire tube 50 from the second combustor 54. A head 82 (e.g., a tool-engageable head with a tool interface 83) may be disposed proximate to the first end 72 of the drive member 34. The head 82 (e.g., tool interface 83, such as a hex portion) may be configured to enable an operator or a tool, for example, to rotate the drive member 34. The drive member 34 may extend through the elongated body 12, and the drive member 34 may be configured to pass through a passageway 84 of the support structure 36. Corresponding threads 85 may be disposed in the passageway 84 of the support structure 36 to enable the drive member 34 and the support structure 36 to be threadably coupled together, in some embodiments. The drive member 34 may also be configured to pass through a hole 86 disposed in a stopper 87 positioned at the first end 14 of the apparatus 10, in some embodiments. Rotation of the drive member 34 may facilitate movement of the support structure 36 along the threads 38 (e.g., toward the second end 16 of the elongated body 12 and/or toward the head 82 of the drive member 34) of the drive member 34 and/or may drive the movable arms 24 toward the second end 16 of the elongated body 12 to compress the crossfire tube 50, as shown above in FIG. 6, for example.

Also shown in FIG. 7 is one embodiment of the support structure 36. As indicated above, the support structure 36 may include the passageway 84 that is configured to receive and to support the drive member 34. In some embodiments, the passageway 84 may include threads 85 configured to threadably couple the support structure 36 to the drive member 34. The support structure 36 may also fit or rest against the stopper 87 in some circumstances, such as when the movable arms 24 are in the stowed position 44 within the elongated body 12 during insertion of apparatus 10 through the crossfire tube 50, for example. In some embodiments, the stopper 87 includes extensions 90 configured to support the movable arms 24 and/or the support structure 36. The passageway 84 of the support structure 36 may generally align with the hole 86 of the stopper 87. The support structure 36 may have a base 92, which is configured to correspond to a shape of the elongated body 12 and to fit within the elongated body 12. For example, in the illustrated embodiment, the base 92 is generally cylindrical in shape to correspond to the cylindrical shape of the elongated body 12. One or more supporting walls 94 may extend from the base 92. The one or more supporting walls 94 may form a recess 96, which may support the movable arms 24. The one or more supporting walls 94 may also support first and second pins 88 (e.g., hinge pins or pivot rods). In certain embodiments, each of the first and second pins 88 extend between two supporting walls 94.

The movable arms 24 may be coupled to the support structure 36 via the pins 88, which extend through holes 89 in the movable arms 24. As shown, the movable arms 24 may be generally L-shaped, with a first portion 100 generally orthogonal to a second portion 102. In certain embodiments, the first portion 100 may have a width 104 that is generally less than a width 106 of the second portion 102. Such a configuration may provide additional support to the movable arms 24 when the movable arms 24 are extended radially-outwardly 20. In certain embodiments, the second portion 102 may be positioned within the recess 96 of the support structure 36.

Figure 10:
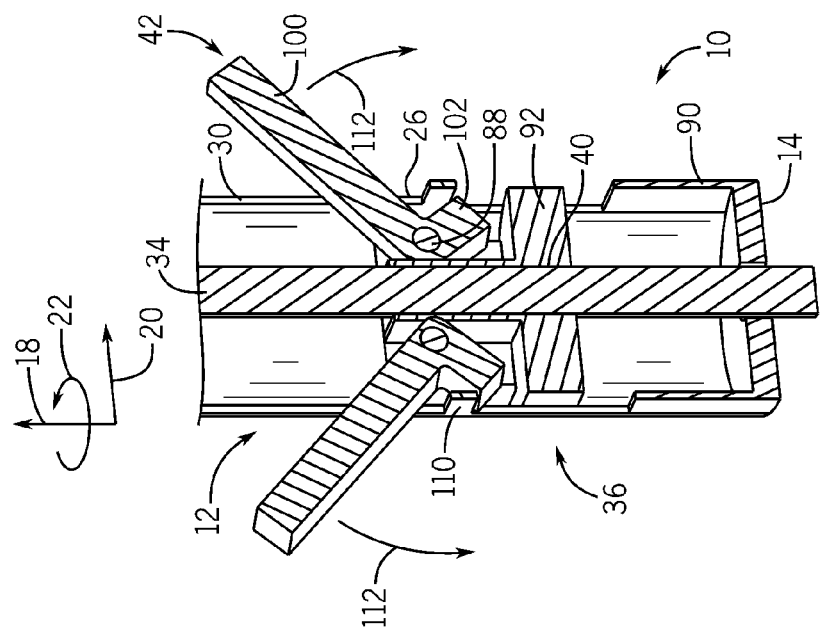
FIG. 10 is a partial side view of the apparatus of FIG. 8, wherein the movable arms move radially-outwardly from the elongated body of the apparatus.
Figure 9:
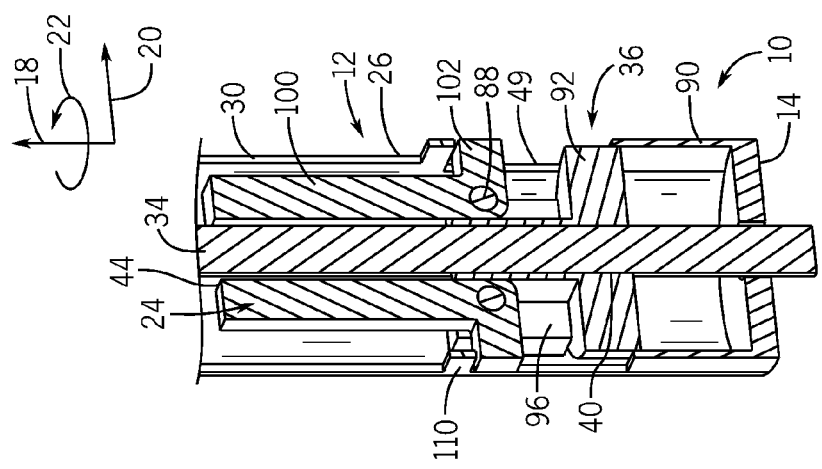
FIG. 9 is a partial side view of the apparatus of FIG. 8, wherein the movable arms are moved axially within the elongated body of the apparatus.
Figure 8:
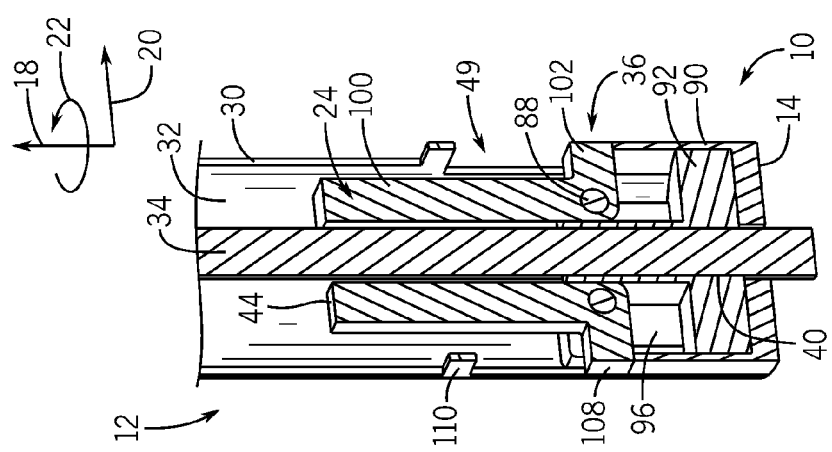
FIG. 8 is a partial side view of an apparatus having one or more movable arms stored within an elongated body, in accordance with one embodiment.

FIGS. 8-10 illustrate one embodiment of the movable arms 24 that may be utilized in accordance with the present disclosure. In FIG. 8, the movable arms 24 are in the stowed position 44 within the elongated body 12. The movable arms 24 may be stowed to enable the apparatus 10 to be inserted into the crossfire tube 50, as shown above in FIG. 4, for example. As shown, when in the stowed position 44, the first portion 100 of the movable arms 24 may be generally parallel to the longitudinal axis 18 of the elongated body 12 and/or may be positioned adjacent to the drive member 34. The second portion 102 may be generally orthogonal to the first portion 100 and/or to the longitudinal axis 18. A face 108 of the second portion 102 may be recessed within the elongated body 12 or may be generally coincident with or aligned with the wall 30 of the elongated body 12, as shown. In some embodiments, the face 108 may protrude slightly from the elongated body 12. The second portion 102 may move longitudinally 18 within the actuation opening 49 as the drive member 34 rotates. As discussed above, the second portion 102 and the actuation opening 49 may be configured (e.g., overlapped) to prevent the moveable arms 24 from moving in a rotational direction 22, thus facilitating movement of the support structure 36 and the moveable arms 24 (e.g., the arm assembly 39) in the longitudinal direction 18 along the drive member 34 as the drive member 34 rotates. The movable arms 24 and the actuation opening 49 may be configured such that the second portion 102 contacts a stop 110 (e.g., activation structure, actuation structure, or protrusion) extending from the wall 30 as the movable arms 24 move in the longitudinal direction 18, as discussed in more detail below. In the illustrated embodiments, the movable arms 24 are coupled to the support structure 36 at pins 88 (e.g., hinge joints or rotatable joints), and the support structure 36 is in turn coupled (e.g., threaded) to the drive member 34 at the threaded connection 40. The drive member 34 may be a lead screw or threaded rod, and rotation of the drive member 34 may facilitate movement of the support structure 36 in the longitudinal direction 18 as described above with respect to FIG. 2. In some embodiments, the recess 96 may be provided between the base 92 of the support structure 36 and the second portion 102 of the movable arms 24 to enable expansion or unfolding of the movable arms 24 in a radial-outward direction 20, as discussed in more detail below.

As shown in FIG. 9, in operation, the drive member 34 may be rotated in place (e.g., without moving longitudinally 18 with respect to the elongated body 12) in the rotational direction 22. As the drive member 34 rotates, the support structure 36 and the movable arms 24 (e.g., the arm assembly 39) are restricted from moving rotationally 22, such as by the wall 30 and/or the actuation opening 49. Thus, as the drive member 34 rotates, the arm assembly 39 may move longitudinally 18 along the threads 38 of the drive member 34, generally away from the first end 14 and toward the second end 16 of the elongated body 12. As the arm assembly 39 moves along the drive member 34, the distance between the moveable arms 24 and the second end 16 of the elongated body 12 decreases. The movable arms 24 (e.g., the second portion 102 of the moveable arms 24) may contact the stop 110, which initiates or triggers rotation of the movable arms 24 about pins 88. As shown in FIG. 10, the movable arms 24 may unfold or extend radially-outwardly 20 from the elongated body 12 through openings 26 as shown by arrows 112. The movable arms 24 may transition (e.g., rotate) from the stowed position 44 in which the first portion 100 is generally parallel to the longitudinal axis 18 of the elongated body 12 to the open position 42 in which the first portion 100 is generally perpendicular to the longitudinal axis 18. Once in the open position 42, the movable arms 24 may continue to be driven to move longitudinally 18 by rotation of the drive member 34 in the manner set forth above. Through such techniques, the moveable arms 24 may be driven toward the second end 16 of the elongated body 12, which enables the movable arms to engage the liner 58 of the combustor 14 as shown in FIG. 5 and facilitates compression of the crossfire tube 50 as shown in FIG. 6.

The description of the movable arms 24 above is not intended to be limiting, but is merely provided as an example of one embodiment for engaging the first combustor 52. Indeed, although two L-shaped arms 24 are illustrated, it should be understood that any suitable number of movable arms 24 may be utilized in accordance with the present disclosure. Furthermore, the movable arms 24 may be arranged circumferentially 22 about the elongated body 12 in any suitable manner. Additionally, the movable arms 24 may have any suitable shape, size, and configuration. For example, the movable arms 24 may be any suitably expanding or extending portion or structure of the elongated body 12 configured to engage the first combustor 52. The movable arms 24 may also be configured to be stored or positioned in any of a variety of manners to facilitate insertion of the apparatus 10 through the crossfire tube 50, and the movable arms 24 may be deployed or actuated via any suitable actuator.

As indicated above, in some gas turbine engines, adjacent combustors may be coupled together or connected by one or more crossfire tubes, which may serve various functions within the gas turbine engine. Combustors of the gas turbine engine may undergo periodic servicing or repair. During service operations, an operator may desire to access and/or to remove one combustor from the gas turbine engine. However, in order to remove the combustor, the combustor is detached (e.g., separated, released, etc.) from the crossfire tube. In order to detach the combustor from the crossfire tube in some gas turbine engines, the operator accesses both ends of the crossfire tube extending between adjacent combustors. Thus, the operator accesses and disassembles multiple combustors in order to remove the one combustor in need of replacement or repair. Such steps can be time consuming, as head end portions of multiple combustors are removed to access the multiple combustors. The apparatus of the present disclosure is configured to facilitate removal of a combustor without accessing both ends of the crossfire tube or disassembling the adjacent combustor. Such an apparatus may desirably reduce the time to inspect or repair the combustor, thus reducing the outage duration required for inspection and repairs. Additionally, such an apparatus may desirably enable removal of the combustor while leaving the adjacent combustor and/or the crossfire tube intact.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus, comprising:
an elongated body having a first end and a second end, wherein the elongated body is configured to be inserted into a tubular structure extending between a first combustor and a second combustor of a gas turbine engine;
a movable arm positioned proximate to the first end of the elongated body, wherein the movable arm is configured to engage a surface of the first combustor when the elongated body is placed within the tubular structure; and
a drive member positioned within the elongated body, wherein the drive member has a head accessible near the second end of the elongated body and is configured to rotate within the elongated body and to drive the movable arm along a longitudinal axis of the elongated body toward the second end to separate the tubular structure from the second combustor.

2. The apparatus of claim 1, wherein the drive member comprises a threaded shaft.

3. The apparatus of claim 2, comprising a support structure disposed within the elongated body, wherein the support structure is threadably coupled to the drive member and is pivotably coupled to the moveable arm.

4. The apparatus of claim 3, comprising an opening in a wall of the elongated body configured to enable the movable arm to move along the longitudinal axis of the elongated body and to prevent the moveable arm from rotating relative to the elongated body.

5. The apparatus of claim 4, wherein the drive member is configured to rotate in place without moving along the longitudinal axis of the elongated body and to drive the support structure to move along the longitudinal axis of the elongated body via the threaded shaft.

6. The apparatus of claim 5, wherein the movable arm is configured to unfold from a stored position within the elongated body when a first portion of the movable arm contacts a stop extending from the wall of the elongated body.

7. The apparatus of claim 1, wherein the movable arm is generally L-shaped, and a first portion of the movable arm is configured to move from a position that is generally parallel to a longitudinal axis of the elongated body to a position that is generally perpendicular to the longitudinal axis of the elongated body to engage the surface of the first combustor.

8. The apparatus of claim 1, wherein the apparatus is configured to enable separation of the tubular structure from the second combustor without accessing the first combustor.

9. The apparatus of claim 1, wherein the tubular structure comprises a crossfire tube.

10. A method, comprising: inserting an elongated body through a passageway of a tubular structure extending between a first combustor and a second combustor, wherein the elongated body has a first end and a second end; engaging a surface of the first combustor with an arm coupled to the elongated body, wherein the arm is disposed proximate to the first end of the elongated body; and decreasing a distance between the arm and the second end of the elongated body to compress the tubular structure to separate the tubular structure from the second combustor.

11. The method of claim 10, comprising separating the tubular structure from the second combustor without accessing the first combustor.

12. The method of claim 10, comprising storing the arm within the elongated body as the elongated body is inserted through the passageway of the tubular structure.

13. The method of claim 10, comprising rotating a drive member to facilitate extension of the arm radially-outwardly from the elongated body to engage the surface of the first combustor.

14. The method of claim 13, wherein the arm is coupled to a support structure that is threadably coupled to the drive member such that rotation of the drive member drives the support structure and the arm along a longitudinal axis of the elongated body.

15. The method of claim 14, wherein the elongated body comprises one or more features to limit rotation of the support structure and the arm.

16. A method, comprising:
   accessing a first end of a crossfire tube via a combustor;
   inserting an elongated body into the first end of the crossfire tube, wherein the elongated body extends from the combustor into an adjacent combustor when disposed within the crossfire tube;
   rotating a drive member coupled to the elongated body to reduce a length of the crossfire tube; and
   separating the crossfire tube from the combustor without accessing the adjacent combustor.

17. The method of claim 16, comprising engaging a surface of the adjacent combustor with a first portion of the elongated body and engaging the first end of the crossfire tube with a second portion of the elongated body, wherein the length of the crossfire tube is reduced by decreasing a distance between the first portion and the second portion of the elongated body.

18. The method of claim 16, comprising separating the crossfire tube from the combustor without cutting the crossfire tube.

19. The method of claim 17, wherein the first portion of the elongated body comprises an arm configured to extend radially-outwardly away from the elongated body.

20. The method of claim 19, comprising storing the arm within the elongated body as the elongated body is inserted though the crossfire tube.

* * * * *